Jan. 13, 1959  R. G. RUSSELL  2,868,358
APPARATUS FOR LONGITUDINALLY FEEDING
A MULTIFILAMENT, CONTINUOUS STRAND
Filed Aug. 29, 1955  4 Sheets-Sheet 1

INVENTOR.
ROBERT G. RUSSELL
BY
Staelin + Overman
ATTORNEYS

Jan. 13, 1959
R. G. RUSSELL
2,868,358
APPARATUS FOR LONGITUDINALLY FEEDING
A MULTIFILAMENT, CONTINUOUS STRAND
Filed Aug. 29, 1955
4 Sheets-Sheet 2
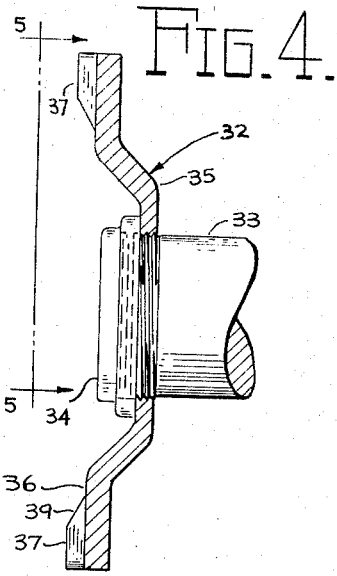
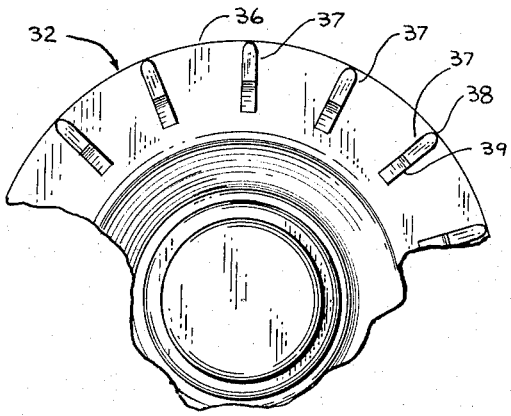
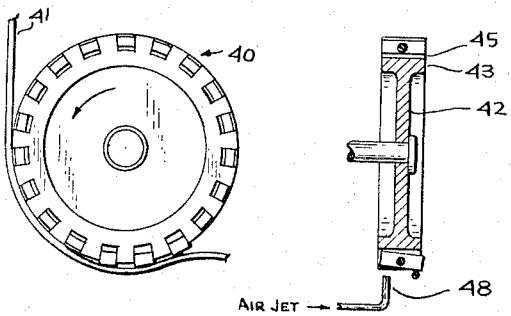
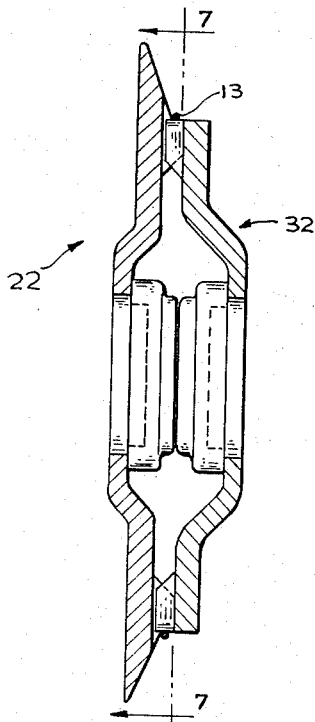
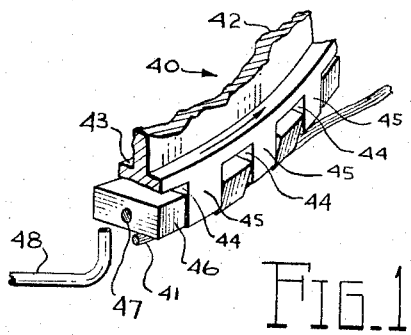
INVENTOR.
ROBERT G. RUSSELL
BY
Staelin & Overman
ATTORNEYS

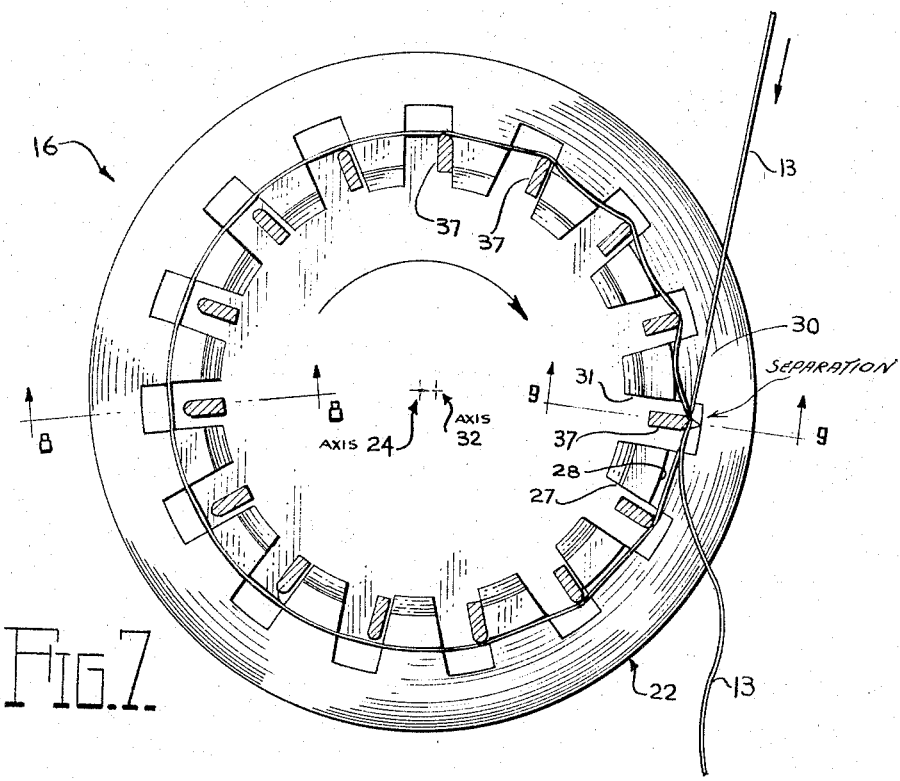
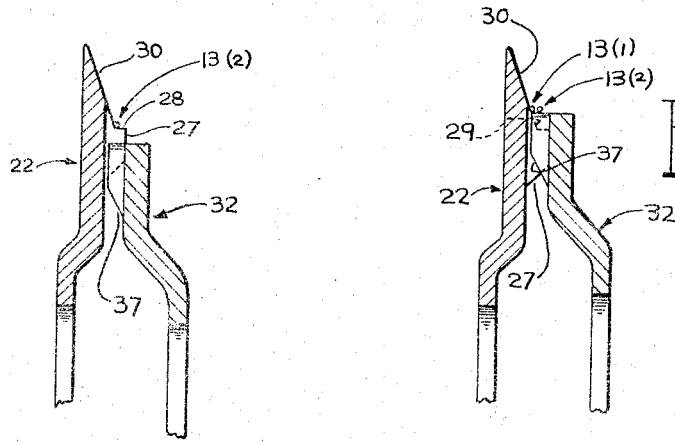

Jan. 13, 1959
R. G. RUSSELL
2,868,358
APPARATUS FOR LONGITUDINALLY FEEDING
A MULTIFILAMENT, CONTINUOUS STRAND
Filed Aug. 29, 1955
4 Sheets-Sheet 4
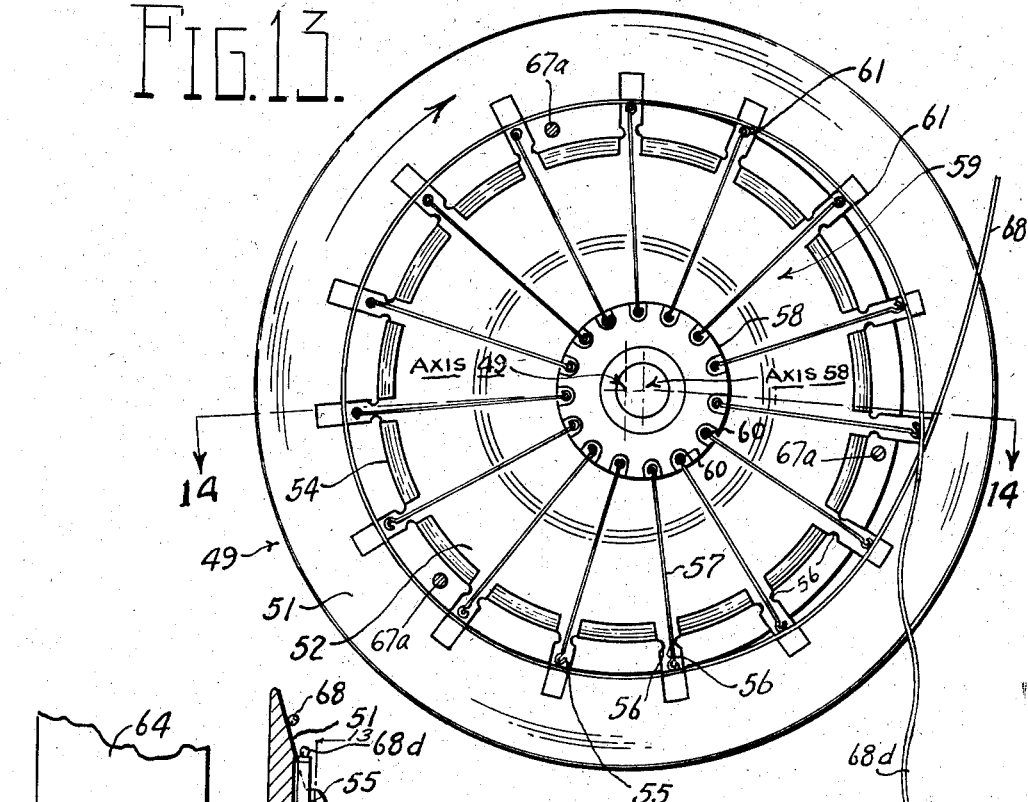
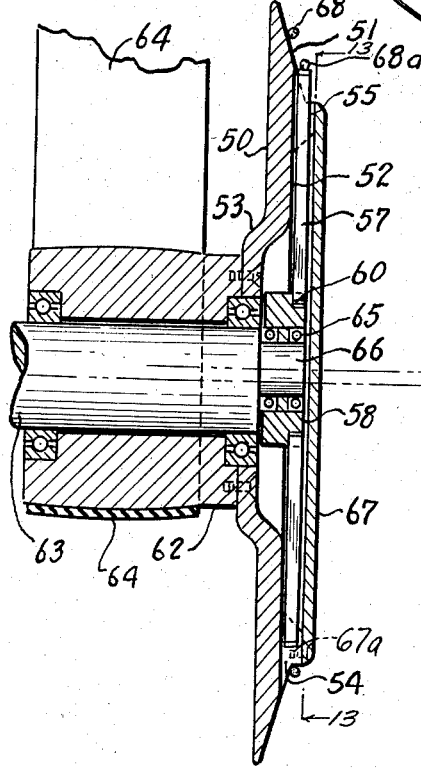
INVENTOR.
ROBERT G. RUSSELL
BY
ATTORNEYS United States Patent Office 2,868,358
Patented Jan. 13, 1959

2,868,358

APPARATUS FOR LONGITUDINALLY FEEDING A MULTIFILAMENT, CONTINUOUS STRAND

Robert G. Russell, Granville, Ohio, assignor to Owens-Corning Fiberglas Corporation, a corporation of Delaware Application August 29, 1955, Serial No. 531,152

6 Claims. (Cl. 203—183)

This invention relates to apparatus for longitudinally feeding a multifilament, continuous strand and, more particularly, to rotary apparatus which can be driven at high lineal speeds for the feeding and, if desired, the attenuation of a multifilament strand, for example, of glass fibers.

Many suggestions have been made in the past for using rotary means for feeding continuous cord, yarn and strand-like masses but for the most part these have been effective only at low lineal speeds, say, in the order of a few hundred feet per minute.

In the attenuation and fabrication of multifilament glass fiber strands a single strand comprises as many as 200 or more individual filaments, each of which is attenuated from a separate stream of molten glass, and the group of filaments is associated together to form an untwisted, multifilament strand. This strand, in present commercial practice, is usually wound upon the exterior of a spool or sleeve which is rotated at sufficient speed to produce a lineal attenuating speed in the order of 10,000 feet per minute. Only by achieving lineal speeds in this order can the strand be uniformly and economically produced on a commercial basis.

Present commercial practices, however, involve a number of undesirable characteristics. Among them may be listed the gradual increase in the lineal speed of attenuation brought about by the increasing size of the mass of strand wound upon the exterior of the sleeve as the package accumulates. Unless compensating changes are made in other variable factors, this increase in lineal speed inevitably produces a slight change in the average size of the individual filaments and, consequently, in the weight and number of yards per pounds of the finished strand.

In addition, because of the increase in size of the package brought about by the repeated overlayment of the strand on the package, the inward tension exerted by the strand increases until it constricts the package so tightly that special centrifugal collets have been required to hold the sleeve outwardly during rotation of the package and yet to permit the removal of the sleeve off the collet when the package is finished. The increasing tension additionally complicates matters by frequently sticking crossing portions of the strand to each other particularly where they may cross at oblique angles.

A still further and perhaps more important disadvantage in this usual manner of attenuating and preliminarily accumulating the continuous multifilament strand arises from the fact that the end of the strand attached to the package is not free and before the strand can be put through subsequent operations such as being combined with other strands to form a yarn, it must be unwound from the sleeve upon which it is originally accumulated. The unwinding operation frequently damages the strand because of tangles and loops which may catch, pulling the strand off the package in such form that it jams or binds in the equipment being utilized to combine a plurality of strands to form a yarn and to otherwise subsequently handle the strand.

It is the principal object of this invention to provide a high speed rotary instrument which will apply attenuating force to a multifilament strand for pulling each of its 200 or more filaments and for combining them together to form the strand and which will automatically release the strand projecting it away from the instrument so that its end remains free and it can be directed to a subsequent handling station.

While various forms of high speed rotary pulling wheels have been suggested in the past, most of them consists of a pair of co-acting wheels mounted upon spaced parallel axes with their peripheries in contact and the strand to be attenuated has been fed between the contacting peripheries of the pulling wheels. While this structure functions very adequately at relatively slow speeds it is difficult to operate co-acting pulling wheels at high speeds in the order of 10,000 or more feet per minute without causing the strand to split and "lick" around the exterior of one or both of the co-acting pulling wheels.

The instant invention, therefore, has as its object the provision of a single high speed rotary pulling wheel about the periphery of which the multifilament strand is wrapped and the rotation of which both applies attenuating tension to the strand and to the filaments and projects the strand along a generally lineal pathway away from the wheel so that it can be accumulated or otherwise subsequently handled.

It is yet another object of this invention to provide a single rotary pulling wheel having a surface of sufficient circumferential extent to apply necessary attenuating tension to a multifilament strand of glass fibers and having auxiliary means for decreasing the force holding the strand on the wheel and for causing the discharge of the strand off of the peripheral surface of the pulling wheel.

It is a further object of this invention to provide a single high speed rotary pulling wheel for attenuating a glass fiber multifilament strand and for feeding the strand along a desired pathway, the wheel having cooperating strand removal means which rotate with the wheel and which displace the strand off the wheel progressively as it rotates to cause discharge of the strand from the wheel.

It is a more specific object of this invention to provide a rotary pulling wheel having spaced peripheral elements onto which the strand being attenuated is generally tangentially guided and including strand removal means rotatable with the pulling wheel and movable radially relative to the peripheral elements thereof for progressively separating the strand from the surface of such elements and effectuating its discharge from the wheel.

These and more specific objects and advantages of the instant invention will be better understood from the specification below and from the drawings, in which Fig. 1 is a fragmentary, simplified view in elevation of apparatus for forming, attenuating and feeding a multifilament continuous glass fiber strand including attenuating apparatus embodying the invention;

Fig. 4 is a view similar to Fig. 2 but of the auxiliary or accessory portion of the apparatus which effects strand discharge from the pulling means illustrated in Figs. 2 and 3;

Fig. 5 is a view similar to Fig. 3 but taken from the position indicated by the line 5—5 of Fig. 4;

Fig. 6 is a vertical sectional view of two cooperating elements embodying the indention in their associated relationship and illustrating how a strand is fed onto the periphery of apparatus embodying the invention;

Fig. 7 is a vertical sectional view taken along the line 7—7 of Fig. 6 and illustrating the feeding of a continuous multifilament strand onto apparatus embodying the invention and its removal from such appartus;

Fig. 8 is a fragmentary sectional view taken along the line 8—8 of Fig. 7;

Fig. 9 is a fragmentary sectional view taken along the line 9—9 of Fig. 7;

Fig. 10 is a view in elevation of another embodiment of the invention;

Fig. 11 is a vertical sectional view of the apparatus shown in Fig. 10; and

Fig. 12 is a fragmentary view in perspective of the apparatus shown in Figs. 10 and 11;

Fig. 13 is a view in elevation of yet another embodiment of the invention, the view being taken along the line 13—13 of Fig. 14;

Fig. 14 is a sectional view taken along the line 14—14 of Fig. 13.

Figure 1:
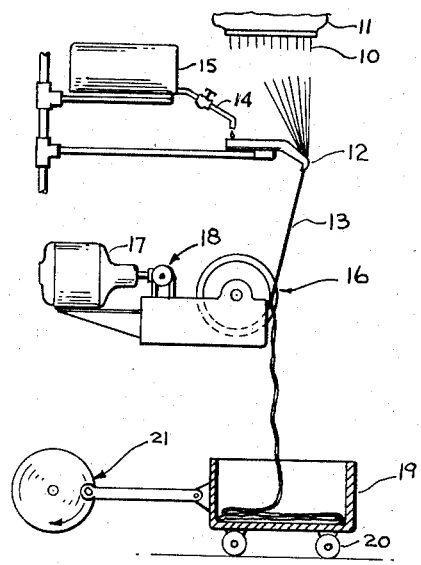

A multifilament glass fiber strand of the type which apparatus embodying the invention is particularly adapted to attenuate and/or feed is fabricated according to present commercial practice from a plurality of individual continuous filaments 10, which are attenuated from corresponding streams of molten glass that flow through spaced orifices in the bottom of a glass melter 11 sometimes called a "bushing." The filaments 10 are led together over a guide 12 for association to form a continuous, untwisted, multifilament strand 13. The guide 12 may also be utilized to apply a suitable coating, lubricant or sizing to the strand 13. For example, such a material may be dripped onto the guide 12 from a supply line 14 connected to a supply tank 15.

According to the invention the multifilament strand 13 is led around the periphery of a pulling wheel generally indicated at 16 in Fig. 1. Which is driven at high speed by a motor 17 acting through suitable gearing 18. After discharge of the strand 13 from the pulling wheel 16 it is projected along a generally lineal path leading to either accumulating means or secondary handling means, such means being illustrated in Fig. 1 as comprising a collecting basket 19 mounted upon rollers 20 and reciprocable by a crank and connecting rod 21.

The pulling wheel 16 embodying the invention consists of two major parts. The first of these is an attenuating wheel generally indicated at 22 and shown in detail in Figs. 2 and 3. The attenuating wheel 22 comprises a disk-like web 23 mounted upon a shaft 24 and held thereon by a locking cap 25. The web 23 is so shaped as to provide an annular planar area upon which are raised a series of circumferentially spaced lugs 27. Each of the lugs 27 has an outer surface 28. The surfaces 28 are all cylindrically curved around the axis of the shaft 24 and, in combination, form an interrupted cylindrical peripheral surface extending circumferentially around the wheel 22. At one side of the surfaces 28 they meet inclined continuations 29 of the lugs 27 which are extensions of an uninterrupted cone-shaped edge 30 that extends around the outermost portion of the web 23. The planar area 26 extends radially outward between the lugs 27 and between their continuations 29, forming the bottom for radial slots 31 between the lugs 27.

In addition to the wheel 22, apparatus embodying the invention comprises a strand removal means, in this embodiment consisting of an oppositely directed spider generally indicated at 32 and shown in detail in Figs. 4 and 5. The spider 32, like the wheel 22, is mounted upon a shaft 33 and retained thereon by a retainer cap 34. The spider 32 has a web 35 oppositely shaped to the web 23 of the wheel 22 and having an annular flat surface 36 upon which are erected a plurality of circumferentially spaced, radially extending, fingers 37. Each of the fingers 37 has a sharply curved outer end 38 and an inclined inner shoulder 39 and the circumferential width of each of the fingers 37 is substantially less than the circumferential width of the slots 31 between the lugs 27.

As can best be seen by reference to Fig. 6, the wheel 22 and spider 32 are mounted by their respective shafts 24 and 33 with their caps 25 and 34 in end to end juxtaposition but with their axes slightly eccentric (Fig. 7), as indicated by the legends "Axis 24" and "Axis 32" in Fig. 7.

The continuous multifilament strand 13 is led downwardly at an angle slightly greater than tangential into engagement with the cone-shaped edge 30 of the wheel 22 at a point where, due to the eccentricity of the axes of the shafts 24 and 32, the fingers 37 protrude through the slots 31 beyond the cylindrical shoulders 28 of the lugs 27. In Fig. 9 it can be seen that this first contact of the continuous strand 13, indicated in that figure as 13(1), is with the concentric edge 30 approximately at the point of conjunction of the concentric edge 30 with the continuation 29 of that one of the lugs 27 located at the side of the wheel 22. It will also be observed in Fig. 9 that the end of that one of the fingers 37 extending through the slot 31 at this point laps the continuation 29 to approximately the same point radially, as the point of engagement of the strand 13(1) illustrated.

As the wheel 22 and spider 32 rotate in a clockwise direction (Fig. 7) away from this first point of contact, the finger 37 is withdrawn inwardly relative to the adjacent lugs 27 and the strand 13, following the end of the finger 37 inwardly due to tension thereon, gradually moved down the inclined continuation 29 of the lugs 27 until it reaches the corner between the continuation 29 and the cylindrical surfaces 28 of the lugs 27 as shown in Fig. 8.

By the time the pulling wheel 22 and spider 32 have rotated approximately a quarter turn the strand has moved to the position indicated in Fig. 8 at 13(2) and is in full contact with the cylindrical surfaces 28 of the lugs 27. The strand 13 remains in such contact over approximately one-half of the circumferential extent of the pulling wheel 22, bridging the slots 31. It has been found that contact of the strand 13 at the point 13(2) with the cylindrical surfaces 28 of the lugs 27 over approximately one-half of the effective periphery of the wheel 22 is more than sufficient surface contact for the wheel 22 to be able to impart tractive force of sufficient power to attenuate the 200 or more filaments of which the strand 13 is comprised.

Having led the strand 13 onto the cylindrical attenuating surfaces of the pulling wheel lugs 27 at about the three-quarters point, the spider 32 begins to remove the strand from the cylindrical attenuating surfaces 28. Progressively moving outwardly relative to the lugs 27 (uppermost part of Fig. 7) the fingers 37 gradually protrude farther and farther through the slots 31 beyond the cylindrical surfaces 28 of the lugs 27 and the tautness of the strand 13 causes it to bridge between the ends of the fingers 37 being gradually stripped off the surfaces 28. Because of the inward radial and axial movement of the strand from the position 13(1) to the position 13(2), when the fingers 37 begin to protrude and once again engage the strand 13, the plane of engagement (perpendicular to the axes of the shafts 24 and 32) is spaced axially from the plane of initial engagement therewith. The strand 13 at the point 13(2) in Fig. 9 is ready to depart and is clear of the oncoming strand 13 at the point 13(1).

As the wheel 22 and spider 32 continue to rotate, moving through the upper right quadrant of Fig. 7, the fingers 37 finally protrude to their maximum extent relative to the lugs 27 and, as indicated by the legend "separation" in Fig. 7, the length of strand in contact with the cylindrical surfaces 28 is finally insufficient to retain the strand 13 on the surfaces 28 and the fingers 37 lift the strand 13 off the surfaces 28 so that centrifugal force projects the strand 13 generally tangentially away from the pulling instrumentality 16.

The embodiment of the invention illustrated in Figs.

1-9, and described above, utilizes strand removal means which are mounted upon a separate rotary member, i. e., the spider 32 to provide the fingers 37 which move radially through the slots 31 to lift the strand off the peripheral surfaces of the lugs 27. In contrast, the embodiment of the invention illustrated in Figs. 10, 11 and 12 comprises a pulling wheel generally indicated at 40 around at least a part of the periphery of which a strand 41 is shown as being fed. The wheel 40 has a web 42 and a slotted rim 43 which has circumferentially spaced lugs 44, the peripheral surfaces of which are cylindrically curved for forming an interrupted cylindrical surface similar to that formed by the cylindrical surfaces 28 of the lugs 27.

In slots 45 between the lugs 44 of this embodiment of the invention, a plurality of balanced rockers 46 are mounted upon generally peripherally extending pivot pins 47. The radial thickness of the rockers 46 is less than the radial depth of the slots 45 and the pivot pins 47 so located that when the rockers 46 are centrally positioned, their outer surfaces are radially inside the cylindrical surfaces of the lugs 44.

The axial plane of the pivot pins 47 is carefully placed upon the median plane of the wheel 40 so that in normal rotation of the wheel 40, the rockers 46 stay balanced by centrifugal force and their outermost surfaces lie just radially inward of the outermost cylindrical surfaces of the lugs 45, i. e., the cylindrical surfaces of the lugs 45 protrude radially outside the peripheral surfaces of the rockers 46 when the rockers 46 are in their balanced position. The strand 41 is in contact only with the peripheral surfaces of the lugs 44.

At a point sufficiently removed from the point of intersection of the strand 41 with the surface of the lugs 44 so that surface engagement of the strand 41 on the lugs 44 is sufficient to apply force for attenuating and feeding the strand 41, there is positioned an air jet, generally indicated at 48, which is directed upwardly against the periphery of the wheel 40 at one side of its median plane. Impingement of the air from the jet 48 against one end of the rockers 46 tilts them upwardly at that end thrusting their other ends radially outward from between the lugs 44 and lifting the strand 41 away from the peripheral surfaces of the lugs 44 in a manner virtually identical with the manner in which the fingers 37 lift the strand off the surfaces 28 of the lugs 27 in the embodiment of the invention illustrated in Figs. 1–9.

Figure 2:
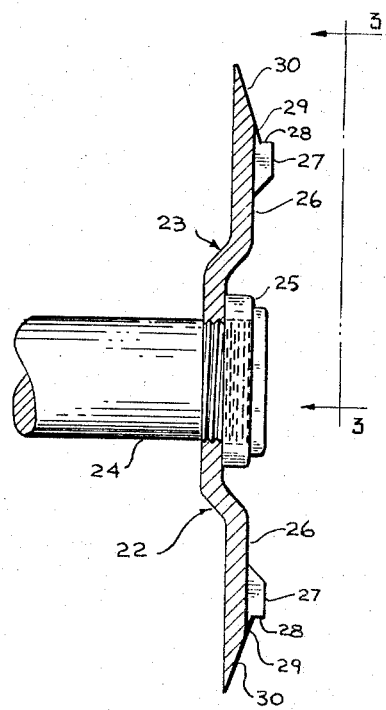
Fig. 2 is a fragmentary vertical sectional view on an enlarged scale of the strand attenuating portion of apparatus embodying the invention.
Figure 3:
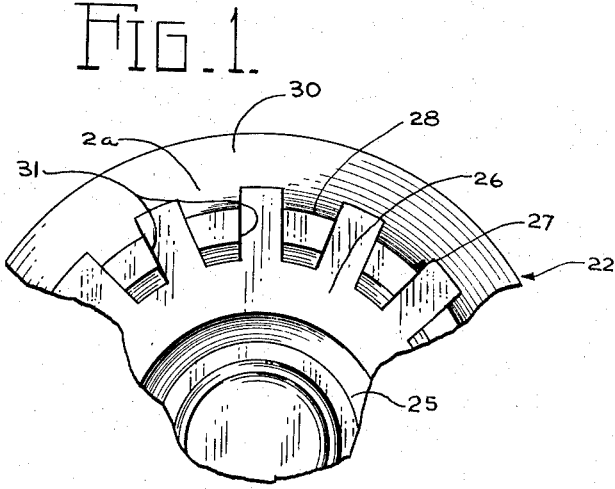
Fig. 3 is a fragmentary view in elevation taken substantially from the position indicated by the line 3—3 of Fig. 2.

The embodiment of the invention illustrated in Figs. 13 and 14 comprises an attenuating wheel generally indicated at 49 and similar in its construction to the attenuating wheel 22 of Figs. 2 and 3. The attenuating wheel 49 has a disk-like web 50 having a beveled outer edge 51, an annular planar area 52 and a central recessed hub 53. A plurality of raised, circumferentially spaced lugs 54 are positioned on the planar area 52 in a manner similar to the lugs 27 of the attenuating wheel shown in Figs. 2 and 3.

Each of the lugs 54 is spaced from its circumferentially adjacent lug by a radially extending slot 55 and the walls of each of the lugs 54 have axially extending ribs 56 protruding into the slots 55.

The ribs 56 of adjacent lugs 54 are so spaced as to permit the free eccentric, radial movement of a plurality of flexible fingers 57 which are pivotally connected at their inner ends to a hub 58 and, with the hub 58, comprise a spider wheel generally indicated by the reference character 59. Each of the fingers 57 is formed from a flat strip of resilient metal such as beryllium, bronze or spring steel, the inner end of which is looped over a pin 60 set into the hub 58. The outer ends of the fingers 57 are formed by turned over portions of the metal from which the fingers 57 are formed, providing small circular pads 61 on the outermost ends of the fingers 57.

The attenuating wheel 49 is mounted upon a hub 62 (Fig. 14) which is rotatably supported upon a stationary shaft 63, having a crowned periphery around which a driving belt 64 passes.

The spider wheel hub 58 is rotatably mounted by bearings 65 on an eccentric stub shaft 66 on the end of the stationary shaft 63. The axis of the attenuating wheel 49 is indicated in Fig. 13 by the legend "Axis 49" and the axis of the spider wheel hub 58 is indicated in Fig. 13 by the similar legend "Axis 58."

A flat disk-like cover plate 67 is mounted by screws 67a upon the upper ends of the lugs 54 and rotates with the attenuating wheel 49.

A continuous strand 68 (Fig. 13) is led into engagement with the beveled edge 51 of the attenuating wheel 49 and, due to the rotation of the structure (clockwise direction, Fig. 13) moves radially inward along the edge 51 until it contacts the pads 61 on the ends of the fingers 57 in the lower right quadrant of the wheel.

Because of the eccentricity of the axis of the hub 58 of the spider wheel 59 relative to the axis of the attenuating wheel 49, the fingers 57 withdraw between the lugs 54 as the wheel continues to turn and the strand comes into contact with the peripheries of the lugs 49.

In the same manner as in the case of the earlier described embodiments of the invention, peripheral contact with the lugs 54 applies force for attenuating the strand 68.

As the attenuating wheel 49 turns through the lower and upper left-hand quadrants the strand 68 remains in contact with the peripheral surfaces of the lugs 54.

As the wheel turns into the upper right-hand quadrant, the eccentricity of the two axes involved causes the flexible fingers 57 to be extended radially through the slots 55 until the pads 61 engage the strand 68 lifting it off of the surfaces of the lugs 54 and finally discharging it approximately 360° removed from the point at which the strand 68 first engaged the attenuating wheel 49. In Fig. 14 the discharging strand is indicated at 68d.

The invention consists of the combination including a pulling wheel having circumferentially spaced, periphery forming elements, i. e., the lugs 27, 44 or 54, with such elements having cylindrically curved outer surfaces and the outer surfaces of such elements forming an interrupted cylindrical, periphery surface with which the strand to be fed is placed in contact. Cooperating with this feeding wheel, the invention also includes strand removal means which are rotatable with the pulling wheel and which comprise a plurality of circumferentially spaced members, i. e., the fingers 37, the rockers 46 or the fingers 57, at least parts of which are movable radially outward through the spaces between adjacent ones of the periphery forming elements, i. e., the lugs 27, 44 and 54, for progressively separating the strand being fed from the cylindrical peripheral surfaces of those lugs 27, 44 or 54 and thus effecting projection of the strand off the pulling wheel 22, 40 or 49.

It has also been found that characteristics of strand departure or projection off the pulling wheels 22, 40 or 49 may be varied by changing the characteristics of the strand contacting surfaces of the spider wheels 32 and 59 and of the rockers 46 (Figs. 10–12). If the surfaces of the strand removal means are treated or fabricated from materials to provide non-wettable surfaces or roughened surfaces, for examples, the strand will not adhere to these surfaces.

Thus, in addition to lifting the strand off the surfaces of the wheel puller, the wheel puller lugs or elements 27, 44 and 54, the fingers 37, rockers 46 or fingers 57 do not adhere to the strand and the strand can more easily depart from the mechanism.

I claim:

1. Apparatus for attenuating and longitudinally feeding a multifilament, continuous strand comprising a rotary, generally circular pulling wheel having a plurality of circumferentially spaced, periphery-forming elements, the outer surfaces of said elements forming an interrupted cylindrical peripheral surface relative to the axis of said wheel for strand contact and adhesion, means for guiding said strand into generally tangential contact with the peripheral surface of said wheel, means for rotating said wheel at high speed and a rotary strand removal structure supported independently of and rotatable in phase with said wheel and comprising a plurality of circumferentially spaced members movable radially outward through the spaces between adjacent ones of the periphery-forming elements on said wheel for progressively separating said strand from the cylindrical surfaces of said elements and from said pulling wheel.

2. Apparatus according to claim 1 in which the periphery-forming elements are a series of circumferentially spaced, axially extending lugs.

3. Apparatus according to claim 2 in which the pulling wheel has a continuous conical peripheral flange at one of its sides and the periphery-forming elements are located radially inward therefrom with their cylinder-forming peripheral surfaces intersecting said flange.

4. Apparatus according to claim 1 in which the rotary strand removal structure is a wheel having fingers protruding axially into the spaces between the periphery-forming elements of said pulling wheel and said wheel is mounted on an axis parallel to and eccentric from the axis of said pulling wheel.

5. Apparatus according to claim 4 in which said fingers have a radial extent at least approximately equal to that of said elements and said axes are spaced so that said fingers protrude radially beyond the peripheral surfaces of said elements at one side of said wheel and are withdrawn inwardly thereof at the other side of said wheel.

6. Apparatus according to claim 1 in which the periphery-forming elements are a series of segmental portions of a cylindrical surface and the elements are circumferentially spaced by narrow axially extending slots through such cylindrical surface, and the radially movable spaced members of the strand removal structure are thin, spoke-like elements slidingly engaged in such slots.

References Cited in the file of this patent

UNITED STATES PATENTS 2,649,645 Cole       Aug. 25, 1953